Patented June 22, 1954

2,681,932

UNITED STATES PATENT OFFICE 2,681,932

LOWER DIALKYLAMINOALKYL ETHERS OF 1,2,3,4 - TETRAHYDRONAPHTHALENE AND SALTS THEREOF

Clinton A. Dornfeld, Mundelein, and John W. Cusic, Skokie, Ill., assignors to G. D. Searle & Co., Chicago, Ill., a corporation of Illinois No Drawing. Application January 23, 1952, Serial No. 267,926

11 Claims. (Cl. 260—567.6)

The present invention relates to a new group of dialkylaminoalkyl ethers of 1,2,3,4-tetrahydronaphthalene and, more particularly, to the 1,2,3,4-tetrahydronaphthalene ethers of the general structural formula

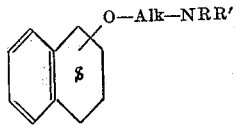

and their salts wherein Alk is a lower alkylene radical and NRR' is a lower monoalkylamino radical, dialkylamino radical or a saturated monocyclic heterocyclyl radical attached to the Alk radical through the nitrogen in the heterocycle.

In the foregoing structural formula Alk represents a lower alkylene radical containing at least two carbon atoms between the oxygen and amine linkages. Such alkylene radicals may be derived from such straight-chained and branched-chained hydrocarbons as ethylene, propylene, butylene, amylene, hexylene, or polymethylenes such as trimethylene, tetramethylene, pentamethylene and hexamethylene. The amino radical NRR' is an aliphatic-type organic amino radical such as a lower monoalkylamino radical or a dialkylamino radical wherein the alkyl substituents contain one to five carbon atoms, or a saturated monocyclic heterocyclyl amino radical wherein the amino group is aliphatic in character as in the case of morpholino, piperidino, pyrrolidino, thiamorpholino, piperazino, lupetidino and related cyclic aliphatic-type amino radicals.

Within the scope of the invention are also compounds wherein R represents hydroxyalkylamino radicals such as ethanolamino, isopropanolamino, methylethanolamino, and related aliphatic amino radicals wherein one or more of the aliphatic substituents carries one or more hydroxy radicals.

The organic bases of the foregoing type form non-toxic salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluene sulfonate, ethylene chlorohydrin, propylene chlorohydrin, allyl bromide, methallyl bromide and crotyl bromide.

The ethers of this inventiton are prepared by reacting 1,2,3,4-tetrahydronaphthalen-1- or 2-ol with an aminoalkyl ester of the structural formula

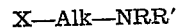

wherein Alk and NRR' are defined as hereinabove, and X represents halogen or the anionic moiety of an aliphatic or aromatic sulfonic acid such as methane sulfonic acid, ethane sulfonic acid, benzene sulfonic acid, toluene sulfonic acid and the like. These condensations are preferably carried out in inert organic solvents such as hydrocarbons boiling in the range of 50–150° C., high boiling ethers and other inert solvents, using as condensation agents an alkali metal, an alkali alkoxide, an alkali metal amide or an alkali metal hydride. Preferred condensation agents are sodium hydride, lithium hydride, sodium methoxide, sodium ethoxide, potassium methoxide, potassium ethoxide, sodamide, lithamide and sodium metal. The alkaline condensation agents are caused to react with the tetrahydronaphthalenol to form alkali metal salts thereof, and then the aminoalkyl ester is added in approximately equivalent amounts, with heating and agitation in the range of 80–150° C. The resulting organic base is isolated from the reaction mixture by conventional procedures such as extraction of mineral acids or evaporation and distillation.

We have found it advantageous to prepare certain of these ethers directly from the tetralone by heating the latter with lithium aluminum hydride in an inert solvent of the type mentioned hereinabove, and then heating the resulting oxide with an ester of the type

to obtain the ether which is isolated in the manner described above.

The compounds which constitute this invention are valuable medicinal agents. Thus the tertiary bases and their salts are spasmolytics and cardiovascular agents. The quaternary ammonium compounds show, in addition, a potent ganglion blocking effect.

The following examples illustrate in detail certain of the compounds which comprise this invention and methods for producing same. However, the invention is not to be construed as limited thereby in spirit or in scope. It will be apparent to chemists skilled in the art that many modifications in materials and methods may be made without departing from the invention. In each of these examples, temperatures are given in degrees centigrade (° C.), relative amounts of materials in parts by weight and pressures in millimeters (mm.) of mercury.

*Example 1*

A mixture of 410 parts of 1,2,3,4-tetrahydro-2-naphthol, 72 parts of sodium hydride and 1700 parts of anhydrous xylene is turbinated at 130° C. for 5 hours and then treated with a solution of 400 parts of β-chloroethyl-diethylamine in 900 parts of anhydrous xylene while the temperature is maintained at 100–120° C. The mixture is stirred and heated at about 125° C. for 12 hours and then cooled and filtered. The filtrate is extracted with dilute hydrochloric acid and the extract rendered alkaline by addition of dilute sodium hydroxide and extracted with ether. This extract is dried over anhydrous potassium carbonate, filtered and evaporated at atmospheric pressure. The residue is distilled at about 180° C. and 19 mm. pressure to yield the 1,2,3,4-tetrahydro - 2 - (β-diethylaminoethoxy)-naphthalene as a yellowish oil.

140 parts of anhydrous citric acid are dissolved in 200 parts of anhydrous 2-propanol and then treated with 200 parts of anhydrous ether. To this solution 180 parts of the above base is added dropwise with stirring. Stirring is continued for an additional hour after which the mixture is filtered and the precipitate is collected on a filter and washed with ether. The citrate thus obtained melts at about 100° C. The base has the structural formula

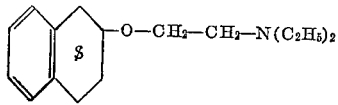

*Example 2*

A solution of 170 parts of 1,2,3,4-tetrahydro-2-(β - diethylaminoethoxy)naphthalene and 75 parts of ethyl bromide in 750 parts of chloroform is kept at 70° C. in a shielded pressure reactor for 15 hours. Upon addition of dry ether an oily layer precipitates which is separated, washed and stirred with ether to induce solidification. The crystalline product is collected on a filter and dried. The 1,2,3,4-tetrahydro-2-(β-diethylaminoethoxy)naphthalene ethobromide melts at about 129–132° C. It has the structural formula

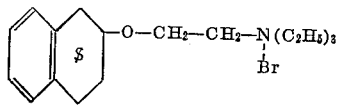

*Example 3*

A mixture of 410 parts of 1,2,3,4-tetrahydro-2-naphthol, 72 parts of sodium hydride and 2600 parts of anhydrous xylene is turbinated at 130° C. for 5 hours and, after being permitted to cool to 90° C., treated by portionwise addition with a solution of 430 parts of β-chloroethyldimethylamine in 450 parts of xylene. The mixture is maintained at 125° C. for 12 hours, chilled and filtered and the filtrate is extracted with dilute hydrochloric acid. This acidic extract is rendered alkaline and extracted with ether. The ether extract is dried over anhydrous potassium carbonate, filtered and evaporated. The 1,2,3,4-tetrahydro - 2 - (β-dimethylaminoethoxy)naphthalene is obtained by vacuum distillation at about 120° C. and 0.2 mm. pressure. 200 parts of the distillate in 300 parts of anhydrous ether are added with stirring to a solution of 163.5 parts of anhydrous citric acid in 470 parts of 2-propanol and 1000 parts of ether. The mixture is stirred, cooled to room temperature and filtered to yield the citrate which melts at about 117° C. The base has the structural formula

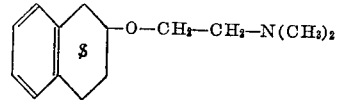

*Example 4*

To a solution of 210 parts of 1,2,3,4-tetrahydro-2-(β-dimethylaminoethoxy)naphthalene in 800 parts of butanone, 200 parts of methyl iodide are added slowly at 0° C. A solid precipitate forms within a few minutes. The 1,2,3,4-tetrahydro-2-(β - dimethylaminoethoxy)naphthalene methiodide thus obtained melts at about 128–129° C. Treatment of a 2-propanol solution of this iodide with silver malate and malic acid and filtration of the silver iodide yields the malate as a white crystalline solid. The iodide has the structural formula

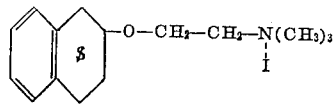

*Example 5*

A mixture of 100 parts of 1,2,3,4-tetrahydro-2-naphthol, 18 parts of sodium hydride and 500 parts of xylene is stirred for 3 hours at 125° C., cooled and treated with a solution of 120 parts of ω-chlorohexyldimethylamine in 300 parts of xylene. After stirring at about 125° C. for 12 hours the mixture is filtered and the filtrate is treated with dilute hydrochloric acid. The aqueous layer is separated, washed with ether, rendered alkaline and extracted with ether. This extract is dried over anhydrous potassium carbonate, filtered and evaporated. The 1,2,3,4-tetrahydro-2-(ω - dimethylaminohexyloxy)naphthalene is obtained as a yellowish oil by vacuum distillation at about 153–161° C. and about 2 mm. pressure. It has the structural formula

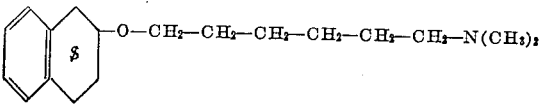

*Example 6*

A mixture of 200 parts of 1,2,3,4-tetrahydro-2-naphthol, 36 parts of sodium hydride and 1000 parts of anhydrous xylene is turbinated at 125° C. for 3 hours, cooled and treated with a solution of 165 parts of 1,3-dichloropropane in 600 parts of xylene. After stirring for 24 hours at 125° C., the mixture is filtered and decomposed with water. The xylene layer is separated, dried over anhydrous calcium chloride, filtered and the solvent removed in vacuo. A solution of 123 parts of the residue of 1,2,3,4-tetrahydro-2-(γ-chloropropoxy)naphthalene and 150 parts of butylamine in 600 parts of xylene is heated at reflux temperature for 3 hours, and then treated with ice and dilute hydrochloric acid. The aqueous layer is separated, washed with ether, rendered alkaline and extracted with ether. This extract is dried over anhydrous potassium carbonate, filtered and evaporated. Vacuum distillation of the residue yields 1,2,3,4 - tetrahydro - 2 - (γ - butylaminopropyl)

naphthalene at about 182–187° C. and 15 mm. pressure. It has the structural formula

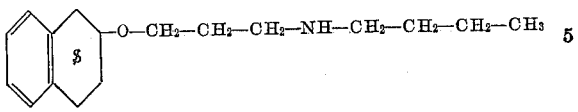

Example 7

To a stirred solution of 54.4 parts of lithium aluminum hydride in 1400 parts of anhydrous ether, a solution of 730 parts of 1-tetralone in 700 parts of anhydrous ether is added dropwise. In the course of the mildly exothermic reaction a white precipitate is formed. The mixture is stirred at 20° C. for 12 hours after which a solution of 339 parts of β-chloroethyldiethylamine in 700 parts of ether is added. After refluxing for 12 hours, the solution is treated with 2000 parts of xylene and heated sufficiently to boil out the ether. Then a further portion of 339 parts of β-chloroethyldiethylamine in 700 parts of ether is added dropwise to the mixture at 120° C. and the reaction is completed by heating at 130° C. for 12 hours. Water and ether are added and the organic layer is separated and extracted with dilute hydrochloric acid. This extract is rendered alkaline and extracted with ether. The ether extract is dried and evaporated to yield the 1,2,3,4-tetrahydro-1-(β-diethylaminoethoxy)naphthalene which is purified by vacuum distillation at about 175–185° C. and 16 mm. pressure. A crystalline hydrochloride is obtained by treatment of an ether solution of the base with one equivalent of a solution of hydrogen chloride in anhydrous 2-propanol. The base has the structural formula

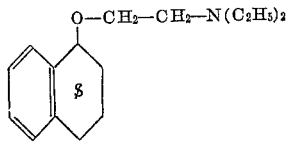

Example 8

To a stirred solution of 109 parts of lithium aluminum hydride in 3000 parts of anhydrous ether, a solution of 146 parts of 1-tetralone in 1500 parts of anhydrous ether is added dropwise. The mixture is stirred at 30° C. for 12 hours and then treated with a solution of 890 parts of γ-chloropropyldiisopropylamine in 1500 parts of ether and refluxed with stirring for 12 hours. 500 parts of xylene are added and the solution is heated to evaporate the ether. After addition of 890 parts of γ-chloropropyldiisopropylamine, stirring and heating at 130° C. is continued for 12 hours. The mixture is then treated first with water and then with ether and the organic layer is separated and extracted with dilute hydrochloric acid. This extract is washed with ether, rendered alkaline and extracted with ether. The ether solution is dried over anhydrous potassium carbonate, filtered and evaporated. From the residue the 1,2,3,4-tetrahydro-1-(γ-diisopropylaminopropoxy)naphthalene is obtained by vacuum distillation at about 191–199° C. and 7–8 mm. pressure. A crystalline citrate is obtained by the method of Example 1. The base has the structural formula

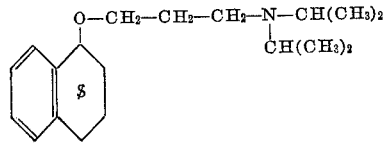

We claim:
1. A compound of the structural formula

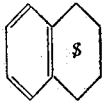

wherein Alk is a lower alkylene radical separating the oxygen atom from the nitrogen atom by at least two carbon atoms and B is a member of the class consisting of the radicals NRR' and

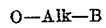

wherein R is a lower alkyl radical, R' and R'' are members of the class consisting of hydrogen and lower alkyl radicals and X is a non-toxic anion.

2. A lower dialkylaminoalkyl ether of 1,2,3,4-tetrahydronaphthalene of the structural formula

wherein Alk is a lower alkylene radical separating the oxygen atom from the nitrogen atom by at least two carbon atoms and R and R' are lower alkyl radicals.

3. A lower dialkylaminoalkyl ether of 1,2,3,4-tetrahydronaphthalene of the structural formula

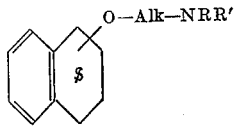

wherein Alk is a lower alkylene radical separating the oxygen atom from the nitrogen atom by at least two carbon atoms and R and R' are lower alkyl radicals.

4. 1,2,3,4 - Tetrahydro-2-(β-diethylaminoethoxy)naphthalene.

5. 1,2,3,4 - Tetrahydro - 2 - β - diethylaminoethoxy-naphthalene ethobromide.

6. 1,2,3,4 - Tetrahydro - 2 - (β-dimethylaminoethoxy)naphthalene.

7. 1,2,3,4 - Tetrahydro - 2 - (β-dimethylaminoethoxy)naphthalene methiodide.

8. A lower dialkylaminoalkyl ether of 1,2,3,4-tetrahydronaphthalene of the structural formula

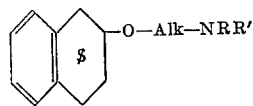

wherein Alk is a lower alkylene radical separating the oxygen atom from the nitrogen atom by at least two carbon atoms and R and R' are lower alkyl radicals.

9. 1,2,3,4 - Tetrahydro - 1 - (β - diethylaminoethoxy)naphthalene.

10. The process of preparing a lower dialkylaminoalkyl ether of 1,2,3,4 - tetrahydronaphthalene of the structural formula

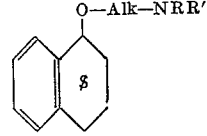

wherein Alk is a lower alkylene radical separating the oxygen atom from the nitrogen atom by at least two carbon atoms and R and R' are lower alkyl radicals, which comprises heating 1-tetralone with lithium aluminum hydride and heating the resulting addition compound with a halide of the structural formula Halogen—Alk—NRR' at a temperature not exceeding 150° C.

11. A compound of the structural formula

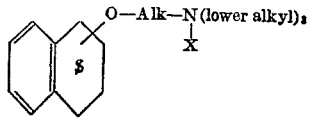

wherein Alk is a lower alkylene radical separating the oxygen from the nitrogen atom by at least two carbon atoms and X is a non-toxic anion.

References Cited in the file of this patent

UNITED STATES PATENTS

| Number | Name | Date |
|---|---|---|
| 2,461,038 | Cusic | Feb. 8, 1949 |

OTHER REFERENCES

Zaugg et al.: "J. Org. Chem.," vol. 15, November 1950, pp. 1197–9.